United States Patent [19]

Hare

[11] Patent Number: 4,620,386
[45] Date of Patent: Nov. 4, 1986

[54] METHOD AND APPARATUS FOR GRIPPING A FISH

[76] Inventor: Larry L. Hare, 13726 58th Ave., NE., Marysville, Wash. 98270

[21] Appl. No.: 352,035

[22] Filed: Feb. 24, 1982

[51] Int. Cl.[4] ............................................ A01K 97/00
[52] U.S. Cl. ........................................... 43/4; 43/53.5
[58] Field of Search ...................... 43/4, 5, 53.5, 54.1, 43/55; 7/106; 294/16, 28, 118; 17/68, 69; 81/425 R, 425 A; 128/321, 323

[56] References Cited

U.S. PATENT DOCUMENTS

| | | | |
|---|---|---|---|
| 389,598 | 9/1888 | Roberts | 43/55 |
| 508,711 | 11/1893 | Hilsher | 43/55 |
| 867,296 | 10/1907 | Park | 128/324 |
| 1,017,093 | 2/1912 | Gilmer | 43/53.5 |
| 1,095,054 | 4/1914 | Wiesenfeld | 128/324 X |
| 2,785,501 | 3/1957 | Nicholson | 43/53.5 |
| 3,153,554 | 10/1964 | Beihl | 294/118 |
| 3,364,933 | 1/1968 | Leopold | 128/321 |
| 3,489,151 | 1/1970 | Eller | 128/321 |
| 3,675,359 | 7/1972 | Ohno | 43/53.5 |
| 3,820,274 | 6/1974 | Drenzyk | 43/53.5 |
| 3,823,719 | 7/1974 | Cummings | 128/322 |

FOREIGN PATENT DOCUMENTS

| | | | |
|---|---|---|---|
| 2521487 | 11/1975 | Fed. Rep. of Germany | 128/321 |
| 450896 | 4/1913 | France | 17/68 |
| 8004408 | 8/1981 | France | 43/54.1 |

*Primary Examiner*—Nicholas P. Godici
*Attorney, Agent, or Firm*—Allegretti, Newitt, Witcoff & McAndrews, Ltd.

[57] ABSTRACT

A method of orienting a fish using a pair of tine members and a pair of jaw members. The pair of tine members are simultaneously inserted into the respective gills of a fish, entering the gills from outside the fish. The jaw members are clamped around the torso of the fish directly below the fish's gills and at an acute angle with respect to the path of insertion of the tine members.

1 Claim, 4 Drawing Figures

METHOD AND APPARATUS FOR GRIPPING A FISH

BACKGROUND OF THE INVENTION

The present invention relates to a fish holder for use by a fisherman to secure a fish in a particular orientation for de-hooking, cleaning, filleting or scaling of the fish.

When catching fish which are spiny or barbed, a fisherman can suffer hand injuries when grasping the fish to remove a fish hook from the fish's mouth. Since the fish is still alive during the de-hooking process, an abrupt movement by the fish may cause the barbs of the fish to enter the fisherman's hand.

Further difficulty in holding a fish is encountered when cleaning and filleting a fish. The fish may be slippery or have spines or horns. The person cleaning the fish must be careful to avoid the spines of the slippery fish during the cleaning process. This is particularly true when older children are first learning to clean fish.

Thus, it would be highly desirable to provide apparatus which can be utilized by a fisherman to grasp a fish in such a fashion so as to permit the fisherman to remove a fishook from the fish's mouth. Such apparatus would be particularly desirable where the tool can further be used to hold the fish during cleaning, filleting or scaling of the fish.

It is therefore an object of the present invention to provide a method and apparatus for use by a fisherman, which eliminates direct handling of the fish during removal of the hook.

It is yet another object of the invention to provide a device especially suitable for children so that a child may remove a hook after the fish is caught and avoid injury by the barbs of the fish or the hook itself.

SUMMARY OF THE INVENTION

These and other objects of the invention are achieved by a fish holder having a pair of gill tine members which are shaped for entry into the gills of the fish. The gill tine members are disposed tranverse to one another and are secured to the ends of a pair of jaw arms which serve to grip the fish underneath the gills. The arms are laterally movable by structure under control of the fisherman, for moving the tine and jaw members relative to each other in a gripping fashion. The arm members carry fish contact surfaces for contacting beneath the gills of the fish as the tine and jaw members are moved together.

DETAILED DESCRIPTION OF THE PREFERRED EMBODIMENT

Figure 1:
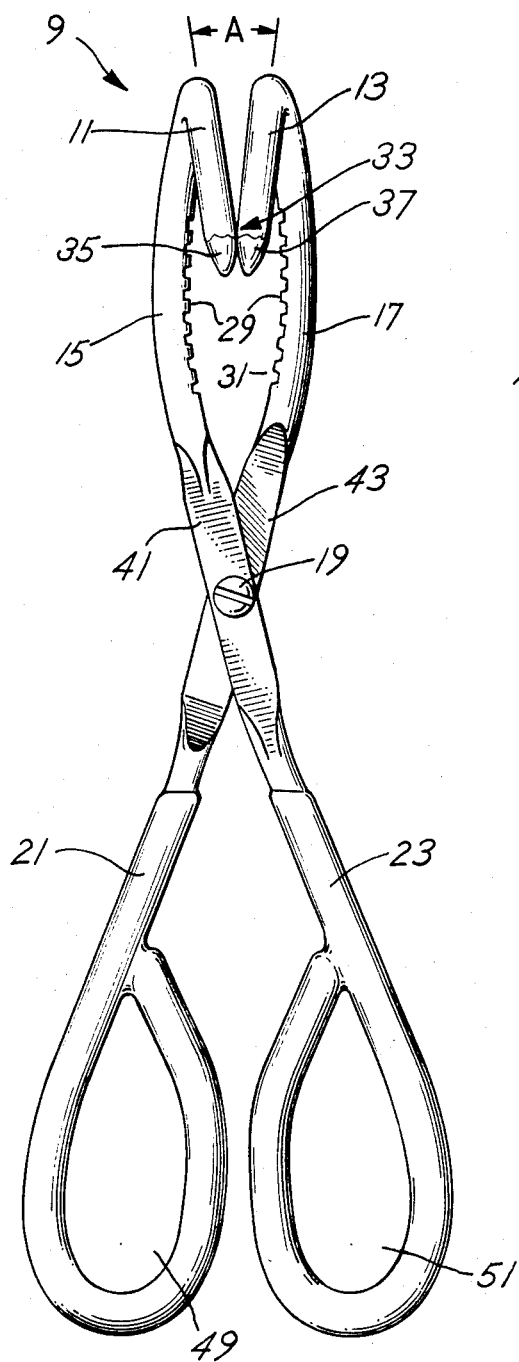
FIG. 1 is a top view of a preferred embodiment of the fish holder of the present invention.

Referring to FIG. 1, a fish holder 9 includes a pair of tine members 11, 13 which extend outwardly from a pair of jaw arms 15, 17. The jaw arms are pivotally mounted in a scissor-like fashion about a pivot point 19. A pair of handles 21, 23 extend from arm 15, 17 providing means for the operator to manually pivot arms 15, 17 relative to one another about point 19.

Figure 2:
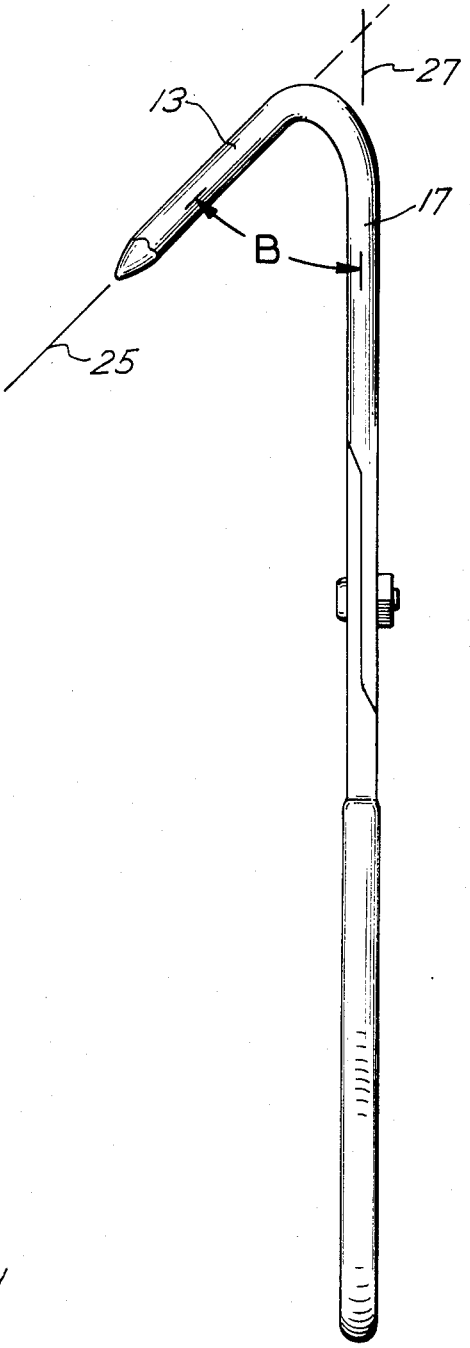
FIG. 2 is a side view of the fish holder of FIG. 1.

As illustrated in FIG. 2, tine members 11, 13 are integrally formed to arms 15, 17 and are disposed in a plane 25 lying transverse to a plane 27 formed by arms 15, 17. Plane 25 of the tine members forms an acute angle B with respect to plane 27 of jaw arms 15, 17. In the preferred embodiment, angle B is approximately 45°.

It has been found that the angling of the tine members relative to the jaw members provides ease of maneuverability of the holder in securing the fish. If angle B is too small, it becomes difficult for the operator to enter the tine members within the gills of the fish. If angle B is too great (approaching 90°), the fish has a chance to thrash itself off of tine members 11, 13.

Figure 4:
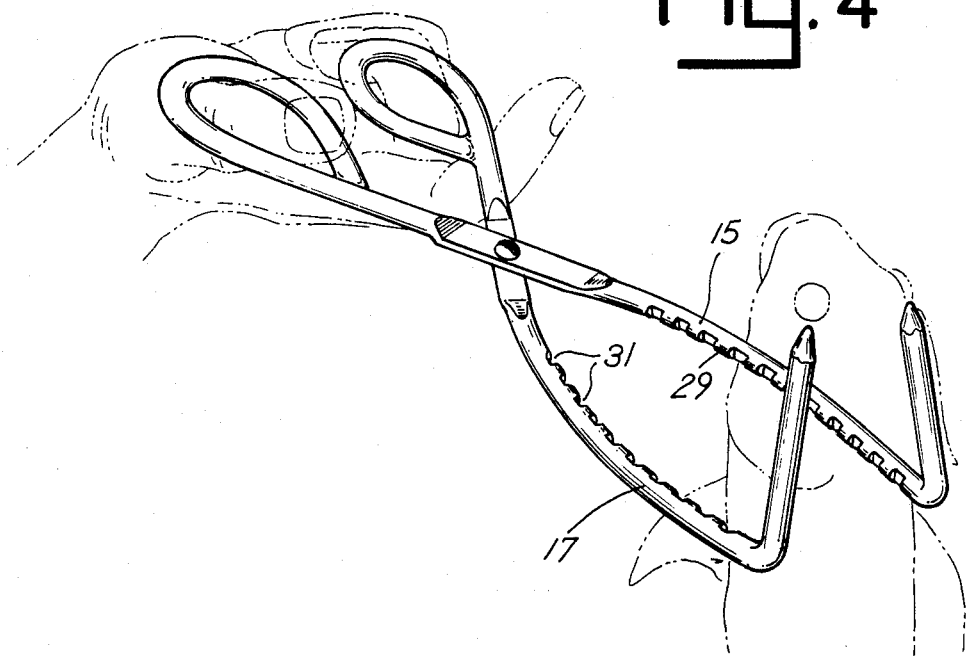
FIG. 4 is a perspective view of the fish holder of FIG. 1 showing a fish in phantom being held by the holder.

As illustrated in FIG. 4, each of jaw arms 15, 17 are generally cylindrical in shape being bowed in order to provide a pair of jaws generally conforming to the torso of a fish. The inside surface 29 or each of arms 15, 17 serve as a contact surface which is serrated by a plurality of spaced cuts in surface 29. The sharp edges of the serrated surface serves to hold the fish between arms 15, 17 during gripping. The serrated surface permits the operator to use less gripping force on handles 21, 23 for preventing rotational turning and slipping of the fish.

Tine members 11, 13 are angled together relative to one another at an acute angle A as indicated in FIG. 1. The acuteness of angle A provides ease of entry and access of the tine members into the gills of the fish. The gill slits are rounded and the head of the fish may narrow towards its mouth. By providing a small angling of tine members 11, 13 (angle A), the tine members meet together within the mouth of the fish, at an end surface 33 when the holder is in the closed position shown in FIG. 1. The meeting of the tines serves as a throat latch preventing the fish from sliding off of tine members 11, 13.

The tine members include end structures 35, 37 which are pointed in configuration for ease of entry into the gills of the fish. The tine members have a smooth surface and do not carry serrations so as to permit easy removal of the fish from the holder when desired by the fisherman.

Figure 3:
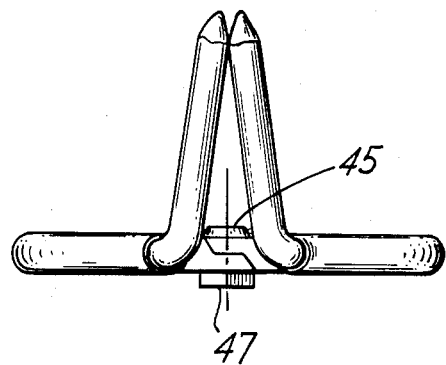
FIG. 3 is an end view of the fish holder of FIG. 1.

Jaw arms 15, 17 are connected to a pair of pivot members 41, 43. Pivot members 41, 43 carry a flat surface upon which the members pivot about point 19. Center point 19 may be formed from a screw bolt 45, or the like, and a mating nut 47 or pressure clip, etc., as illustrated in FIG. 3.

Pivot arms 41, 43 overlap one another at pivot point 19 and are connected to handles 21, 23. The handles include finger openings 49, 51 which permit the fisherman to grasp handles 21, 23 pivoting them relative to pivot point 19. Pivoting movement of handles 21, 23 causes the lateral movement of jaw arms 15, 17 relative to each other. This motion in turn causes the movement of tine members 11, 13 relative to one another.

Following the hooking and reeling-in of the fish, the fisherman suspends the fish on the line and grips handles 21, 23 for operation of the holder. The operator holds the holder in his left hand and pivots the handles to open tines 11, 13. The belly of the fish is positioned toward the holder. As the gills of the fish flare open, the fisherman guides the tine members into the gills of the fish, as illustrated in FIG. 4. The tine members are slid in an upward motion along the sides of the fish entering the fish's gills.

The angled disposition of the tine members relative to the jaw arms provides the necessary angle for facilitating the pointed structure of the tine members to enter the gills and slide toward the mouth opening of the fish. The handle end of the holder is held slightly higher than the tine end as the tine members are slid into the gills of the fish.

Thereafter, handles 21, 23 are squeezed together bringing the pointed ends of the tines together in a throat latch. The pointed ends of the tine members will contact depending upon the size of the fish. As the tine members are brought together, jaw arms 15, 17 carry fish contacting surfaces 29 against the outer surface of the fish beneath the gills. If the fish is thrashing, the squeezing of the handles together firmly holds the fish preventing the fish from leaving the holder. If the fish is not thrashing, the weight of the fish against the angled tine members tends to pull the jaw members together. Once in this gripped position, the hook may be removed from the fish's mouth and the fish strung on an appropriate stringer or the like.

This preferred embodiment of the fish holder of the present invention can grasp spiny, slimy, coarse, or heavily scaled fish without risk of injury to the fisherman or to the fish. As will suggest itself, different arrangements and sizes of the fish holder to suit the fishing situation can be utilized. The fish holder can be made of any suitable material but preferably is made from stainless steel.

It should be understood, of course, that the foregoing description refers to a preferred embodiment of the invention and that modifications or alterations may be made therein without departing from the spirit or scope of the invention as set forth in the appended claims.

What is claimed is:

1. A method of orienting a fish using a pair of tine members and a pair of jaw members comprising the steps of:

simultaneously inserting a pair of tine members into respective gills of a fish, said tine members entering the gills from outside the fish and at an acute angle relative to each other;

clamping the jaw members around the torso of the fish directly below the fish's gills and at an acute angle with respect to the path of insertion of said tine members; and moving said tine members toward one another simultaneously with said step of clamping.

* * * * *